(12) United States Patent
Karp et al.

(10) Patent No.: US 6,321,328 B1
(45) Date of Patent: Nov. 20, 2001

(54) PROCESSOR HAVING DATA BUFFER FOR SPECULATIVE LOADS

(75) Inventors: Alan H. Karp, Palo Alto; Rajiv Gupta, Los Altos, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/274,166

(22) Filed: Mar. 22, 1999

(51) Int. Cl.[7] .................................................. G06F 12/00
(52) U.S. Cl. ........................................... 712/225; 712/235
(58) Field of Search ................................... 712/225, 205, 712/207, 235, 233; 711/119

(56) References Cited

U.S. PATENT DOCUMENTS

| | | | | |
|---|---|---|---|---|
| 5,526,499 | * | 6/1996 | Bernstein | 712/216 |
| 5,542,075 | * | 7/1996 | Ebcioglu | 717/9 |
| 5,611,063 | * | 3/1997 | Loper | 712/205 |
| 5,623,628 | * | 4/1997 | Brayton | 711/141 |
| 5,694,574 | * | 12/1997 | Abramson | 711/140 |
| 5,826,053 | * | 10/1998 | Witt | 712/210 |
| 5,961,615 | * | 10/1999 | Zaid | 710/54 |
| 6,006,317 | * | 12/1999 | Ramagopal | 712/23 |
| 6,065,103 | * | 5/2000 | Tran | 711/156 |

* cited by examiner

*Primary Examiner*—Eric Coleman

(57) ABSTRACT

Computer apparatus includes an execution unit for executing a sequence of instructions which may include a speculative load instruction, a memory for storing data required by the instructions for execution, a low latency data cache for holding data accessed in the memory in response to the instructions, a low latency data buffer for holding speculative data accessed in the memory in response to the speculative load instruction, and a controller. The controller loads the speculative data from the memory into the data buffer in response to the speculative load instruction when the speculative data is not present in the data cache or the data buffer, and loads the speculative data from the data buffer into the execution unit. The speculative data may be loaded from the data buffer into the execution unit when the speculative load instruction is executed or when the speculative load instruction is committed. The speculative data is supplied to the execution unit with low latency and without contamination of the data cache.

16 Claims, 4 Drawing Sheets

PROCESSOR HAVING DATA BUFFER FOR SPECULATIVE LOADS

FIELD OF THE INVENTION

This invention relates to central processor architecture and, more particularly, to techniques for improving the performance of central processors which execute speculative load instructions.

BACKGROUND OF THE INVENTION

One of the key goals in the design of computers is to reduce the latency involved in memory access. Generally, central processing unit (CPU) speeds have increased faster than memory access time, thereby exacerbating the problem. Thus a memory access operation may require multiple CPU cycles, and the processor may be stalled while waiting for data to execute the next instruction. Unless steps are taken to reduce memory latency and its effects, the benefits of high speed processors are not achieved.

In addition to design improvements which reduce memory latency per se, computer architectures typically have features which limit the effects of memory latency. One common approach to reducing the effects of memory latency is to utilize a cache memory. The cache is a relatively small, low latency memory that contains data required by instructions currently being executed. When a load instruction is executed, main memory is accessed and a block of data containing the required data word is placed in the cache. Typically that block of data remains in the cache until it is replaced by another block that needs the space. On subsequent accesses to the same data block, the data is read from the cache with low latency. The success of the cache depends on the fact that computer programs typically require multiple accesses to the same data block within a short time and on the fact that the cache has substantially lower latency than the main memory. The performance of caches may be optimized with respect to capacity, replacement algorithms and the like. Both data caches and instruction caches have been utilized.

Another way to reduce the effects of memory latency is to execute load instructions out of order in the instruction sequence. More particularly, the load instruction is moved earlier in the instruction sequence, so that the accessed data will be available to the execution unit by the time it is needed. As a result, delay caused by memory latency is avoided.

However, when the load instruction is moved earlier in the instruction sequence, it is likely to be executed speculatively, because the compiler does not know if one or more subsequent branch instructions will take a path away from the load instruction. Unfortunately, data blocks accessed as part of a speculative load instruction that is never needed will displace data in the cache that may be needed later. A delay may be incurred in reloading the displaced data when it is needed. Thus, loading of data into the cache in response to a speculative load instruction may have an adverse effect on performance, despite the fact that the speculative data is not used.

Accordingly there is a need for improved computer apparatus and methods of operation wherein the adverse effects of memory latency are reduced.

SUMMARY OF THE INVENTION

According to a first aspect of the invention, computer apparatus is provided. The computer apparatus comprises an execution unit for executing a sequence of instructions which may include a speculative load instruction, a memory for storing data required by the instructions for execution, a low latency data cache for holding data accessed in the memory in response to the instructions, a low latency data buffer for holding speculative data accessed in the memory in response to the speculative load instruction, and a controller. The controller loads the speculative data from the memory into the data buffer in response to the speculative load instruction when the speculative data is not present in the data buffer or the data cache, and loads the speculative data from the data buffer into the execution unit. The speculative data may be loaded from the data buffer into the execution unit when the speculative load instruction is executed or when the speculative load instruction is committed. The speculative data is supplied to the execution unit with low latency and without contamination of the data cache.

In a first embodiment, the controller further comprises means for transferring the speculative data from the data buffer to the data cache when the speculative load instruction is committed. In a second embodiment, the controller further comprises means for retaining the speculative data in the data buffer when the speculative load instruction is committed. In either case, the speculative data is provided to the execution unit with low latency. If the speculative data is not needed, it is eventually replaced in the data buffer, without having contaminated the data cache. In the event that the data is transferred from the data buffer to the data cache after the speculative load instruction is committed, the data is no longer speculative and therefore does not contaminate the data cache.

The controller may further comprise means for replacing data in the data buffer with the speculative data when data is loaded from the memory into the data buffer and space is not available in the data buffer. Any suitable replacement algorithm may be used. The data buffer preferably has a fully-associative architecture. Typically, the data cache has a larger capacity than the data buffer.

According to another aspect of the invention a method is provided for executing instructions in a computer apparatus comprising an execution unit, a memory and a low latency data cache. The method comprises the steps of supplying to the execution unit a sequence of instructions which may include a speculative load instruction, storing in the memory data required by the instructions for execution, and holding in the data cache data accessed in the memory in response to the instructions. The method further comprises providing the computer apparatus with a low latency data buffer. Speculative data required by the speculative load instruction is loaded from the memory into the data buffer when the speculative data is not present in the data buffer or the data cache, and is loaded from the data buffer into the execution unit, either when the speculative load instruction is executed or when the speculative load instruction is committed.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
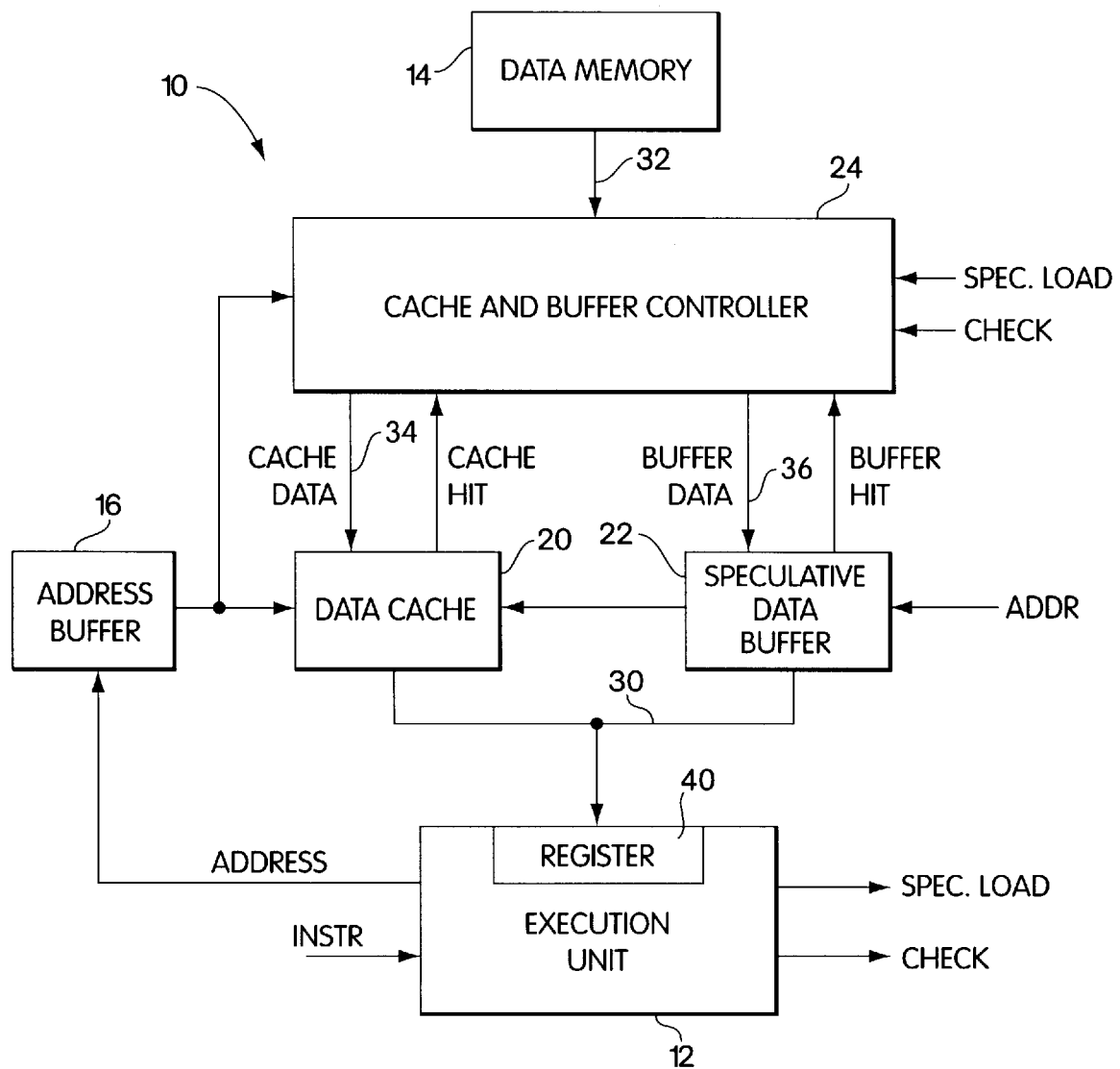
FIG. 1 is a block diagram of an embodiment of computer apparatus in accordance with the invention.

A block diagram of computer apparatus in accordance with an embodiment of the invention is shown in FIG. 1. Portions of the computer apparatus associated with the present invention are shown. It will be understood that the computer apparatus includes additional elements which are well known to those skilled in the art. Computer apparatus 10 includes an execution unit 12, which may be part of a central processing unit, and a data memory 14, which stores data needed by execution unit 12 for execution of instructions. Computer apparatus 10 further includes an address buffer 16, a data cache 20, a speculative data buffer 22, and a cache and buffer controller 24. The cache and buffer controller 24 controls refilling of data cache 20 when a cache miss occurs and refilling of data buffer 22 when a buffer miss occurs. The cache and buffer controller 24 performs additional steps associated with operation of the present invention, as described below.

Execution unit 12 receives a sequence of instructions from an instruction cache (not shown) or other instruction source, decodes the instructions and performs the operations specified by the instructions. Only the instructions relevant to the present invention are described herein. However, it will be understood that the execution unit 12 may execute any of the instructions in the instruction set of the CPU.

Execution unit 12 generates an address of data required for execution of the instruction based on address information contained in the instruction. The address is supplied through address buffer 16 to data cache 20, speculative data buffer 22, and cache and buffer controller 24. In a first case, the required data is present in data cache 20. Data cache 20 supplies a cache hit signal to cache and buffer controller 24, and the required data is supplied by data cache 20 to a register 40 in execution unit 12 on data bus 30. In a second case, the required data is present in speculative data buffer 22, and a buffer hit signal is supplied by data buffer 22 to cache and buffer controller 24. In this case, the required data is supplied by data buffer 22 to register 40 in execution unit 12 on data bus 30. In a third case, the required data is not present in data cache 20 or data buffer 22 and must be accessed in data memory 14. In this case, cache and buffer controller 24 accesses a data block containing the required data in data memory 14. The data block containing the required data is supplied on memory data bus 32 and cache data bus 34 to data cache 20, or is supplied on memory data bus 32 and buffer data bus 36 to data buffer 22, and the required data is supplied to register 40 in execution unit 12. The accessed data block is retained in data cache 20 or data buffer 22 until it is replaced by subsequent data that needs the space. Instructions in the instruction sequence may access the same data block multiple times with low latency.

The instructions relevant to the present invention include a speculative load instruction and a check instruction. When one of these instructions is decoded by the execution unit 12, a respective signal is supplied to cache and buffer controller 24. A speculative load instruction is a load instruction which is rescheduled for execution earlier in the instruction sequence and which becomes speculative by reason of one or more branch instructions between the rescheduled location of the load instruction and the original location of the load instruction. If a branch instruction takes a path away from the load instruction, the load instruction is not used. The check instruction is placed in the original location of the load instruction when the load instruction is rescheduled. The check instruction is executed only if the load instruction is committed (used). The operations performed by the cache and buffer controller 24 in response to the speculative load instruction and the check instruction are described below.

The data cache 20 typically has a relatively small capacity and a faster access time than data memory 14. When execution unit 12 is executing a program, it accesses data in the data cache 20, thereby taking advantage of the speed of the data cache. When the data is not present in the data cache, the data is read from data memory 14 and is placed in data cache 20 for subsequent use. When a significant percentage of accessed data is present in the data cache 20, the operating speed of the computer is increased.

Conventional data caches take advantage of a characteristic of the execution of many computer programs known as temporal locality. When program execution has temporal locality, the same data is used more than once, typically multiple times, in a relatively short period. This may occur, for example, in a program loop that is executed multiple times. When data having temporal locality is present in the data cache, performance is enhanced. By contrast, a data cache provides little or no speed improvement with respect to data having a small amount of temporal locality, and a data cache provides no speed improvement with respect to data that is used only once during the program execution.

Data caches also take advantage of a common characteristic of the execution of computer programs known as spatial locality. When program execution has spatial locality, data words in a small area of memory are used by the program. The transfer of blocks of data into the data cache increases the probability of a cache hit when the program has spatial locality.

As indicated above, load instructions may be rescheduled for execution earlier in the instruction sequence in order to enhance performance and to reduce the effects of memory latency. Such load instructions become speculative load instructions when they are moved before branch instructions that follow them in the original instruction sequence. In order to enhance computer performance, the speculative data buffer 22 is utilized during the execution of speculative load instructions. Speculative data buffer 22 has a relatively small capacity and a faster access time than data memory 14. When execution unit 12 is executing a speculative load instruction, it accesses the required speculative data in data cache 20 or data buffer 22. When the speculative data is not present in data cache 20 or data buffer 22, a data block containing the required speculative data is read from data memory 14 and is placed in data buffer 22. The speculative data can be loaded from data buffer 22 into register 40 in execution unit 12 when the speculative load instruction is executed or when the speculative load instruction is committed. If the speculative load instruction is not committed, the speculative data may be left in data buffer 22 until it is replaced during execution of a later speculative load instruction. In either case, the speculative load instruction has been executed without contaminating data cache 20 with speculative data. If the speculative load instruction is committed, the speculative data is no longer speculative and may be transferred to data cache 20 or may be left in data buffer 22, as described below.

Speculative data buffer 22 preferably has a fully-associative architecture, wherein a data address requested by execution unit 12 is compared with the addresses of data blocks contained in the data buffer to determine whether the required data is present. Data buffer 22 is characterized by a fast access time and a relatively small capacity.

Figure 2:
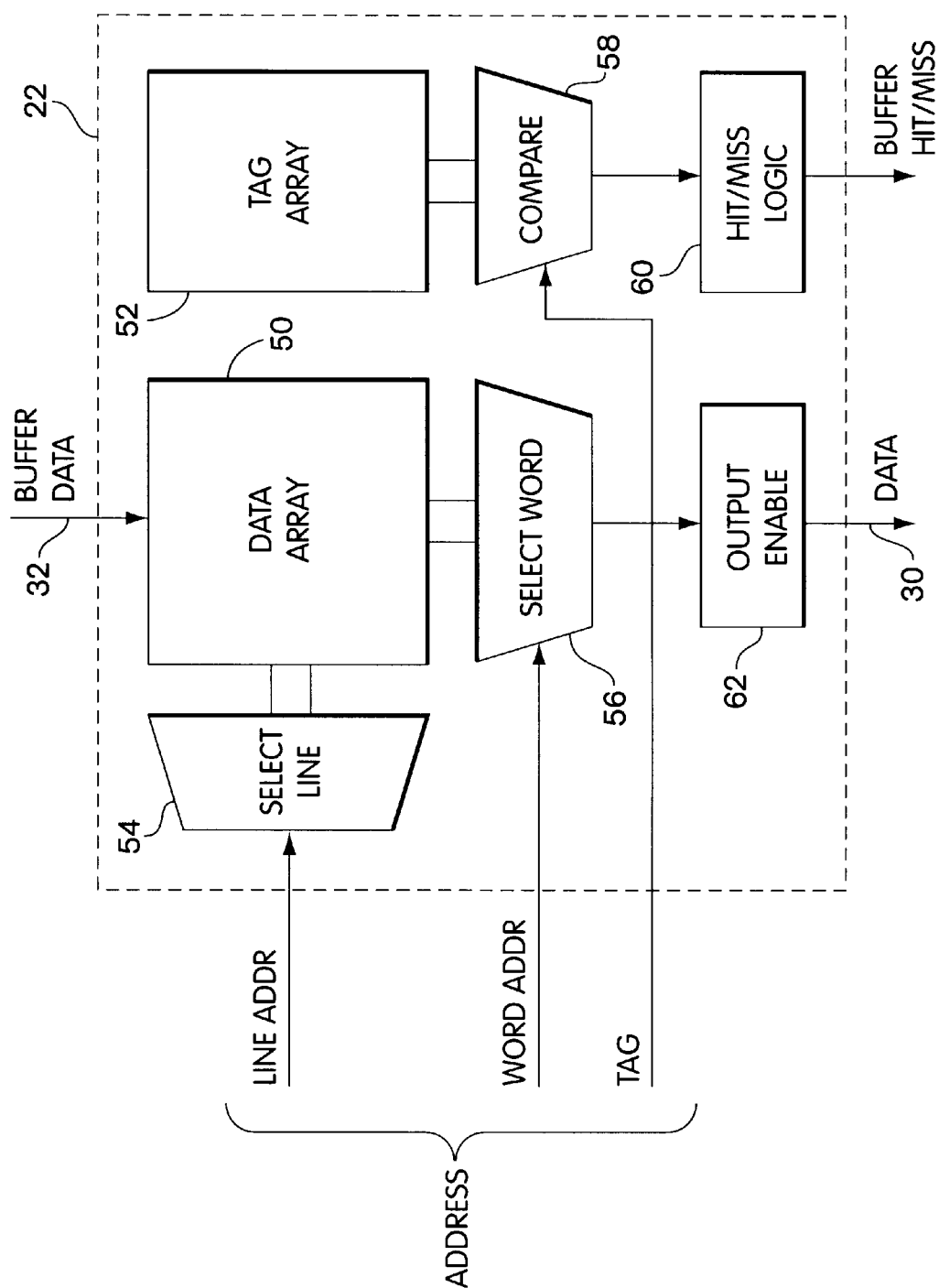
FIG. 2 is a block diagram of one example of the speculative data buffer shown in FIG. 1.

A block diagram of an example of a suitable data buffer configuration is shown in FIG. 2. Data buffer 22 includes a data array 50 for storing speculative data and a tag array 52 for storing tags, which are portions of the physical data addresses. The data array 50 may be organized as lines of data words. A tag in tag array 52 corresponds to each line of data array 50. By way of example, data array 50 may include 64 lines, each having 8 words. The data buffer 22 may include a single bank, as shown in FIG. 2, or two or more banks in a set-associative configuration. The structure and operation of set-associative memory configurations are known in connection with cache memories.

In addressing data buffer 22, the address supplied by execution unit 12 is converted to a line address, which specifies a line in data array 50, a word address, which specifies a particular word in the addressed line, and a tag which includes the remaining bits of the address. The line address and the word address constitute an index to an entry in data array 50. The tag is stored in tag array 52.

When data is being accessed, the address, including the line address, the word address and the tag, is supplied to data buffer 22. The line address is supplied to a decoder 54 which selects one of the lines of data array 50. The word address is supplied to a data selector 56 which selects one of the words in a line. The tag is supplied to tag array 52 for comparison with the tags stored therein. The comparison function is illustrated in FIG. 2 as a comparator 58. In practice, the tag array 52 performs the function of a content addressable memory. The comparator 58 determines whether a tag matching the tag in the address is stored in tag array 52. The output of the tag array comparator 58 is supplied to hit/miss logic 60. Hit/miss logic 60 determines whether the data specified by the physical address is present in the data buffer and supplies a buffer hit signal to the cache and buffer controller 24 (FIG. 1). One state of the buffer hit signal indicates a buffer hit (requested data present), and the other state of the buffer hit signal indicates a buffer miss (requested data not present). When the data is present in data array 50, hit/miss logic 60 supplies an enable signal to an output enable circuit 62, and the word specified by the word address is output as data to the execution unit.

When a block of data is written from data memory 14 into data buffer 22, a line of data array 50 is selected by cache and buffer controller 24 in accordance with a replacement algorithm. The data block from data memory 14 is written into the selected line of data array 50, and the tag portion of the memory address is written into tag array 52. In one example, the cache and buffer controller 24 uses a replacement algorithm wherein the oldest data in data block array 50 is replaced, if no space is available. Any suitable replacement algorithm may be used within the scope of the invention.

As indicated above, cache 20 and speculative data buffer 22 are characterized by faster access times and lower capacity than data memory 14. By way of example, data memory 14 may have a capacity of 64 megabytes or larger, data cache 20 may have a capacity of 64 kilobytes or larger, and data buffer 22 may have a capacity of 4 kilobytes. It will be understood that these capacities are given by way of example only and are not limiting as to the scope of the present invention.

Figure 3:
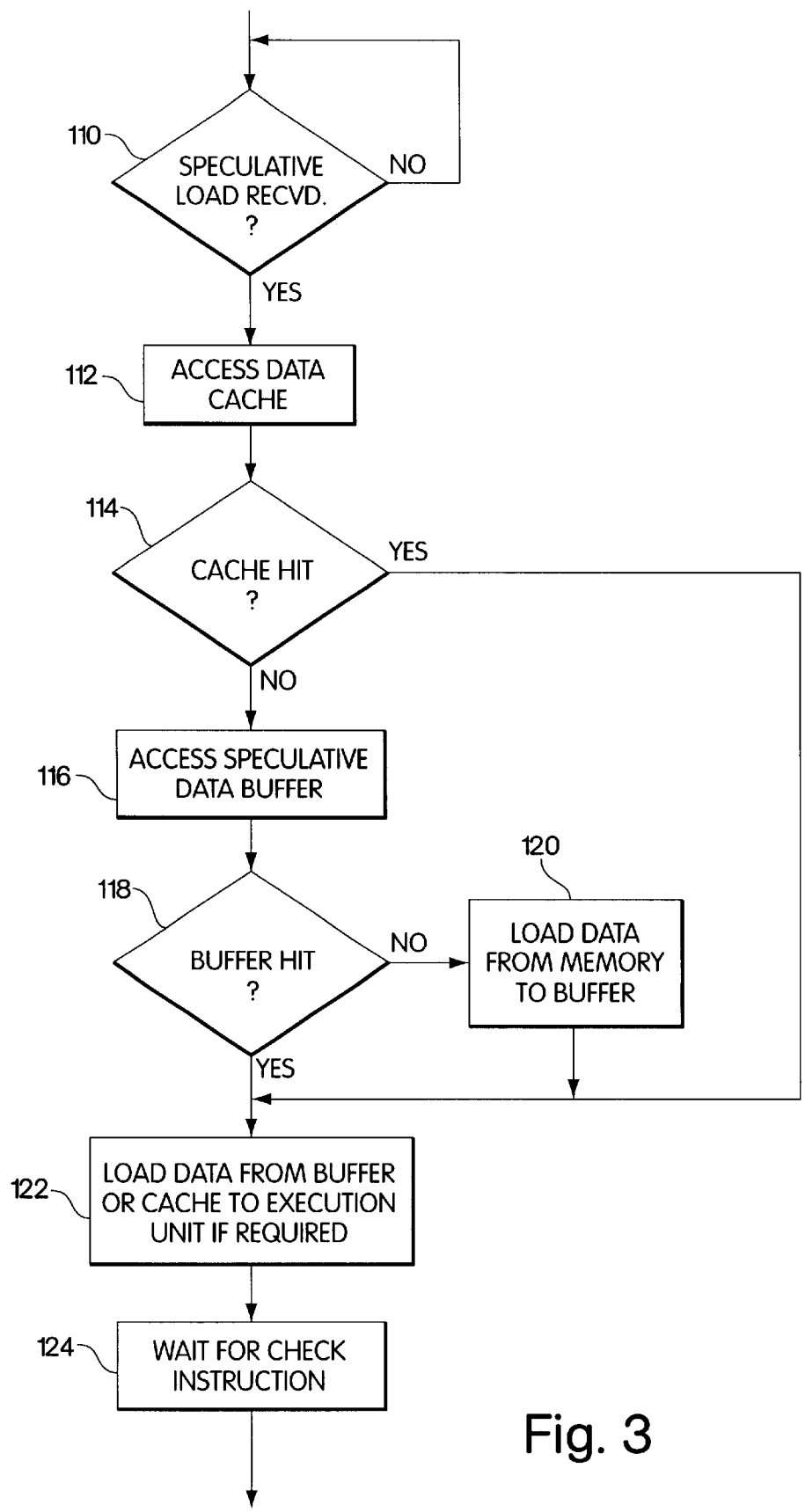
FIG. 3 is a flow diagram that illustrates an example of a process executed by the cache and buffer controller in response to a speculative load instruction.

A flow chart of an example of a process executed by cache and buffer controller 24 when a speculative load signal is received is illustrated in FIG. 3. In step 110, a determination is made as to whether a signal indicative of a speculative load instruction has been received. As shown in FIG. 1 and described above, a signal indicative of a speculative load instruction is received from execution unit 12 when a speculative load instruction is scheduled for execution. In step 112, data cache 20 is accessed. Specifically, the address of the required speculative data is supplied to data cache 20. In step 114, a determination is made by cache and buffer controller 24 as to whether a cache hit has occurred. A cache hit indicates that the required data is present in data cache 20. When a cache hit occurs, the process proceeds to step 122 (described below). When a cache hit does not occur, indicating that the required speculative data is not present in data cache 20, the process proceeds to step 116, and speculative data buffer 22 is accessed. Specifically, the address of the required speculative data is supplied to data buffer 22. In step 118, a determination is made as to whether a buffer hit has occurred. A buffer hit indicates that the required speculative data is present in data buffer 22. If the required speculative data is present in data buffer 22, the process proceeds to step 122 (described below). If the required speculative data is not present in data buffer 22, the process proceeds to step 120 and the speculative data is loaded from data memory 14 into data buffer 22 by cache and buffer controller 24. As indicated above, the oldest data in data buffer 22 may be replaced when space is not available in data buffer 22. The process then proceeds to step 122.

At step 122, the data required by the speculative load instruction is available either in data cache 20 or in data buffer 22. The speculative data may be loaded from the cache 20 or data buffer 22 into register 40 in execution unit 12 when the speculative load instruction is executed. Alternatively, loading of the speculative data into register 40 may be deferred until the speculative load instruction is committed. In a first embodiment, the computer apparatus is configured to load the speculative data into register 40 in execution unit 12 when the speculative load instruction is executed. In a second embodiment, the computer apparatus is configured to load the speculative data into register 40 when the speculative load instruction is committed. In a third embodiment, the speculative data may be loaded into register 40 either when the speculative load instruction is executed or when the speculative load instruction is committed, under program control. For example, the speculative load instruction may contain a bit or a state that specifies when the speculative data is loaded into register 40. Following step 122, the process proceeds to step 124 to wait for a check instruction.

Figure 4:
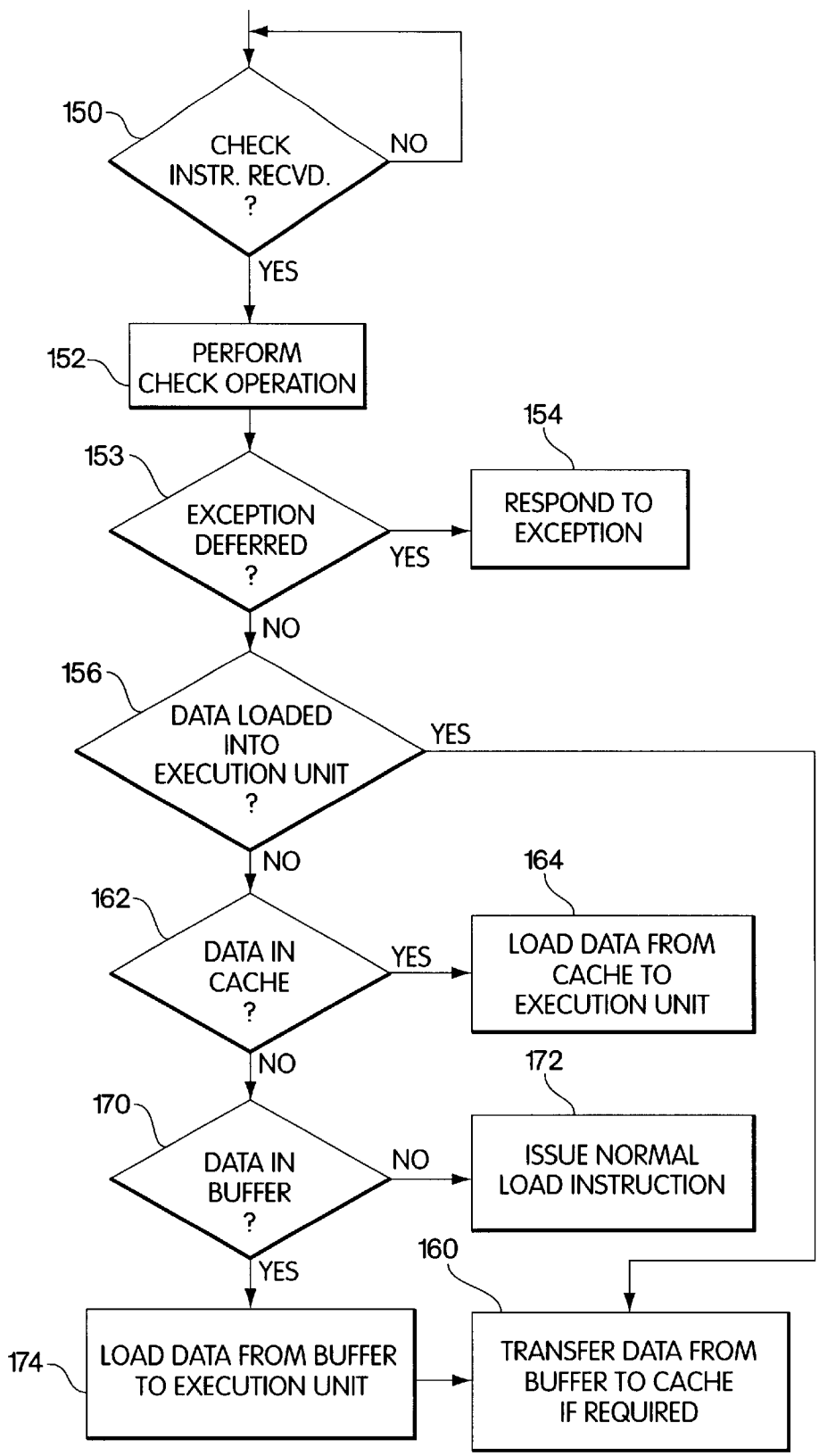
FIG. 4 is a flow diagram that illustrates an example of a process executed by the cache and buffer controller in response to a check instruction.

A flow chart showing an example of a process implemented by cache and buffer controller 24 in response to a check instruction is illustrated in FIG. 4. In step 150, a determination is made as to whether a signal indicative of a check instruction has been received from execution unit 12. The load instruction that was rescheduled for speculative execution is replaced in the instruction sequence with a check instruction. Therefore, the check instruction is executed only if the load instruction is committed. If a branch instruction takes execution away from the check instruction, the check instruction is not executed. The check operation is performed in step 152. The check operation, for example, may involve checking a status register in the execution unit for an exception that occurred during execution of the speculative load instruction and was deferred. If an exception was deferred during execution of the speculative load instruction, as determined in step 154, the process responds to the exception in step 154. The response to the exception may involve generating an unrecoverable exception or entering recovery code in which the load instruction is re-executed.

In step 156, a determination is made as to whether the speculative data was loaded into register 40 in execution unit 12 during execution of the speculative load instruction, as discussed above in connection with step 122 of FIG. 3. If the speculative data was previously loaded into register 40, the process proceeds to step 160 (discussed below). If the speculative data was not loaded into register 40 during execution of the speculative load instruction, a determination is made in step 162 as to whether the required data is present in data cache 20. If the required data is present in data cache 20, the process proceeds to step 164, and the required data is loaded from data cache 20 into register 40 in execution unit 12, thereby completing execution of the check instruction. If the required data is determined in step 162 not to be present in data cache 20, the process proceeds to step 170. A determination is made in step 170 as to whether the required data is present in data buffer 22. If the required data is not present in data buffer 22, the process proceeds to step 172 and reissues the speculative load instruction as a normal load instruction. When a determination is made in step 170 that the required data is present in data buffer 22, the process proceeds to step 174. The required data is loaded from data buffer 22 into register 40 in execution unit 12. The process then proceeds to step 160.

Step 160 involves the case where speculative data is loaded into data buffer 22 by a speculative load instruction, and the speculative data is subsequently used, i.e., the speculative load instruction is committed. In a first case, the speculative data is retained in the data buffer 22 until it is replaced in accordance with the replacement algorithm. The data may be reused any number of times during execution of the program. In a second case, the speculative data is transferred from data buffer 22 to data cache 20 when the speculative load instruction is committed. The transfer of the speculative data from data buffer 22 to data cache 20 does not have an adverse impact on performance, because the speculative data is no longer speculative when the load instruction is committed, and the previously speculative data may now be treated as normal data. Furthermore, the transfer of data to data cache 20 makes space available in data buffer 22 for additional speculative data. The computer apparatus may be configured to retain the speculative data in data buffer 22 until it is replaced, to transfer the speculative data to data cache 20 when the speculative load instruction is committed, or to perform these operations under program control. For example, the check instruction may contain a bit or a state which specifies whether or not to transfer the speculative data from data buffer 22 to data cache 20. Thus, step 160 involves transfer of the speculative data from data buffer 22 to data cache 20, if required.

While there have been shown and described what are at present considered the preferred embodiments of the present invention, it will be obvious to those skilled in the art that various changes and modifications may be made therein without departing from the scope of the invention as defined by the appended claims.

What is claimed is:

1. Computer apparatus comprising:
   an execution unit for executing a sequence of instructions which may include a speculative load instruction;
   a memory for storing data required by said instructions for execution;
   a low latency data cache for holding data accessed in said memory in response to said instructions;
   a low latency data buffer for holding speculative data accessed in said memory in response to said speculative load instruction; and
   a controller for loading the speculative data from said memory into said data buffer in response to said speculative load instruction when the speculative data is not present in said data cache or said data buffer and for loading the speculative data from said data buffer into said execution unit, wherein the speculative data is supplied to said execution unit with low latency and without contamination of said data cache.

2. Computer apparatus as defined in claim 1, wherein said controller further comprises means for loading the speculative data from said data buffer into said execution unit when said speculative load instruction is executed.

3. Computer apparatus as defined in claim 1, wherein said controller further comprises means for loading the speculative data from said data buffer into said execution unit when said speculative load instruction is committed.

4. Computer apparatus as defined in claim 1, wherein said controller further comprises means for transferring the speculative data from said data buffer to said data cache when said speculative load instruction is committed.

5. Computer apparatus as defined in claim 1, wherein said controller further comprises means for retaining the speculative data in said data buffer when said speculative load instruction is committed.

6. Computer apparatus as defined in claim 1, wherein said controller further comprises means for replacing the oldest data in said data buffer with the speculative data when data is loaded from said memory into said data buffer and space is not available in said data buffer.

7. Computer apparatus as defined in claim 1, wherein said data buffer has a fully-associative architecture.

8. Computer apparatus as defined in claim 1, wherein said data cache has a larger capacity than said data buffer.

9. In computer apparatus comprising an execution unit, a memory and a low latency data cache, a method for executing instructions, comprising the steps of:
   supplying a sequence of instructions, which may include a speculative load instruction, to said execution unit for execution;
   storing in said memory data required by said instructions for execution;
   holding in said data cache data accessed in said memory in response to said instructions;
   providing a low latency data buffer;
   loading speculative data required by said speculative load instruction from said memory into said data buffer when the speculative data is not present in said data cache or said data buffer; and
   loading the speculative data from said data buffer into said execution unit.

10. A method as defined in claim 9, wherein the step of loading the speculative data from said data buffer into said execution unit is performed when said speculative load instruction is executed.

11. A method as defined in claim 9, wherein the step of loading the speculative data from said data buffer into said execution unit is performed when said speculative load instruction is committed.

12. A method as defined in claim 9, further comprising the step of transferring the speculative data from said data buffer to said data cache when said speculative load instruction is committed.

13. A method as defined in claim 9, firther comprising the step of retaining the speculative data in said data buffer when said speculative load instruction is committed.

14. A method as defined in claim 9, wherein the step of loading the speculative data from said memory into said data buffer includes replacing the oldest data in said data buffer when space is not available in said data buffer.

15. A method as defined in claim 9, wherein the step of providing a data buffer comprises providing a fully-associative data buffer.

16. A method as defined in claim 9, wherein the step of providing a data buffer comprises providing a data buffer having a capacity that is smaller than the capacity of said data cache.

* * * * *